July 20, 1965  C. G. RAGLA  3,195,804
AUTOMATIC THROTTLE ADVANCE MECHANISM
Filed March 13, 1963  2 Sheets-Sheet 1
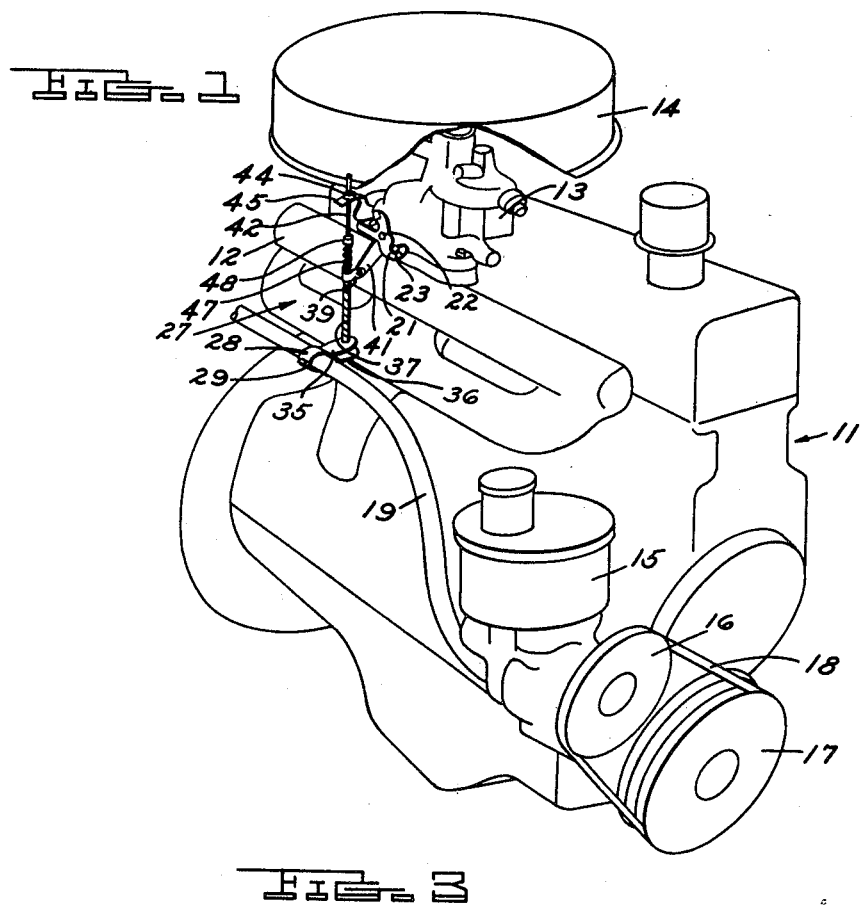
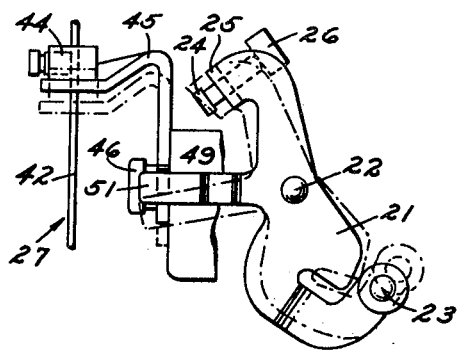
CARL G. RAGLA
INVENTOR.
BY J. R. Faulkner
E. A. Beutler
ATTORNEYS July 20, 1965 C. G. RAGLA 3,195,804
AUTOMATIC THROTTLE ADVANCE MECHANISM
Filed March 13, 1963 2 Sheets-Sheet 2
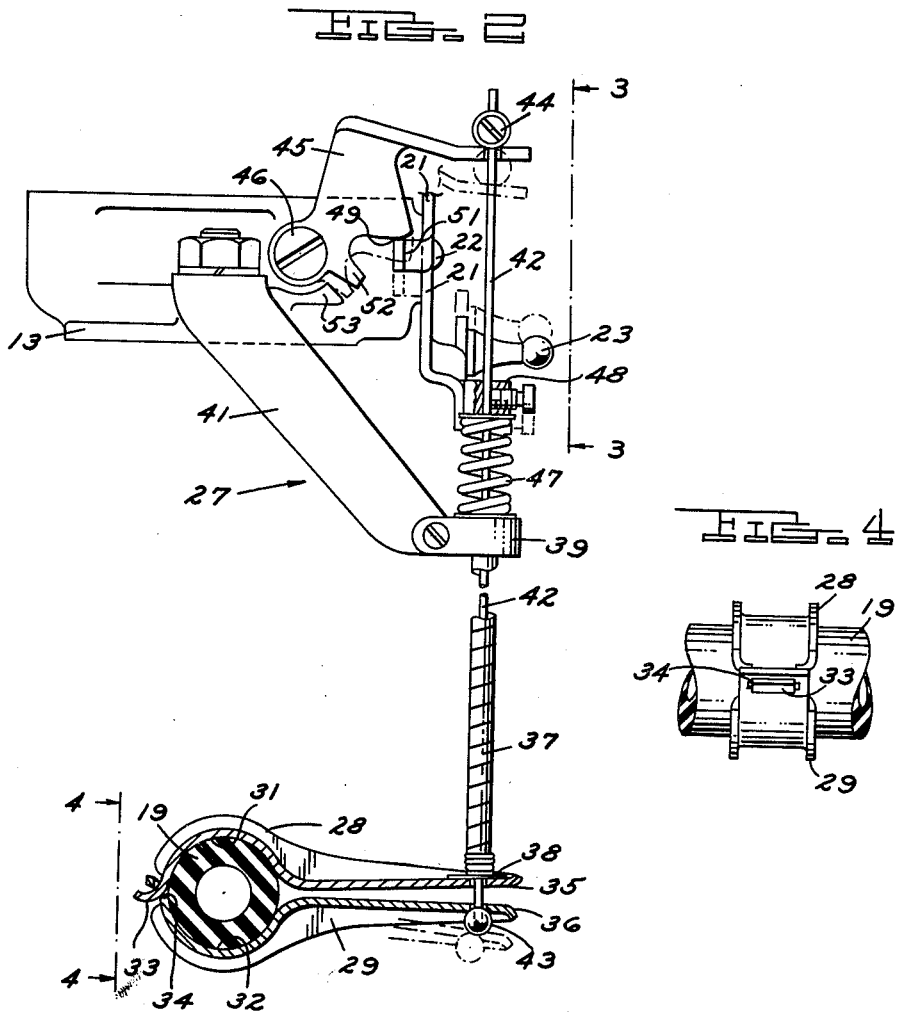
CARL G. RAGLA
INVENTOR.
BY J. R. Faulkner
E. A. Beutler
ATTORNEYS

United States Patent Office 3,195,804
Patented July 20, 1965

3,195,804
AUTOMATIC THROTTLE ADVANCE
MECHANISM
Carl G. Ragla, Dearborn Township, Wayne County, Mich., assignor to Ford Motor Company, Dearborn, Mich., a corporation of Delaware
Filed Mar. 13, 1963, Ser. No. 264,942
5 Claims. (Cl. 230—3)

This invention relates to an automatic throttle advance mechanism for the internal combustion engine of a motor vehicle.

In the modern motor vehicle, the internal combustion engine is called upon to provide the motive power for a number of accessories in addition to propelling the vehicle. Accessories such as power steering and air conditioning impose considerable loads upon the engine when operated at full capacity. If the vehicle is powered by a small displacement engine, the power requirements of a power steering pump or an air conditioning compressor can readily exceed the output of the engine at its normal idle speed. Unless the engine idle speed is advanced, it will stall under these circumstances.

It has been proposed to provide an automatic idle advance mechanism to prevent the stalling of small displacement engines equipped with accessories that impose high power requirements at normal idle speeds. The automatic idle advance mechanism is responsive to the power requirements of the accessory and increases the engine idle speed to satisfy the increased power requirements at idle.

Since the power requirements of both a power steering pump and an air conditioning compressor are directly related to their output pressure, it has been the practice to employ this pressure as the actuating force for the idle advance mechanism. This result has been accomplished through the provision of a fluid servo device that coacts with a portion of the engine throttle linkage. The servo device is connected to the output side of the accessory pump by a conduit and advances the idle speed upon actuation by a pressure change.

Although the output pressure of the accessory pump offers an excellent indicator of the need for an advanced idle speed, the use of a fluid servo to accomplish the speed up is not completely satisfactory. The servo and attendant conduit offer a possible source of leakage because of the high pressures involved and the pressure-tight connections required are expensive.

It is, therefore, an object of this invention to provide an automatic idle advance mechanism, responsive to changes in the output pressure of an engine-driven accessory pump, that requires no additional fluid conduit or fluid servo devices.

It is a further object of this invention to provide an improved mechanism for sensing the fluid pressure in a conduit without requiring a hydraulic connection with the conduit.

A motor vehicle embodying this invention includes an internal combustion engine having means for varying the speed of the engine and for establishing a normal idle speed. An accessory pump driven by the engine supplies fluid under pressure through a conduit to an accessory for actuating the latter. A pressure responsive device is positioned in contact with the exterior of the conduit for sensing pressure changes within the conduit. Idle speedup means are actuated by the pressure responsive device for advancing the idle speed of the engine in response to increases in fluid pressure in the conduit.

The pressure responsive device that comprises a portion of this invention includes first and second pivoted elements in contact with opposite sides of an elastically expansible conduit. The elements are yieldably biased into their engagement with the conduit and pivot relative to each other upon pressure induced diametrical changes in the conduit.

Further objects and advantages of this invention will become more apparent as this description proceeds, particularly when considered in conjunction with the accompanying drawings, wherein:

FIGURE 1 is a perspective view of a portion of the engine compartment of a motor vehicle incorporating this invention.

FIGURE 2 is an enlarged elevational view of the automatic throttle advance mechanism shown in FIGURE 1.

FIGURE 3 is a cross sectional view taken along line 3—3 of FIGURE 2.

FIGURE 4 is a cross sectional view taken along line 4—4 of FIGURE 2.

Referring now in detail to FIGURE 1 of the drawings, an internal combustion engine is indicated generally at 11. The engine 11 has an induction system comprising an intake manifold 12, a carburetor 13 and an air cleaner 14. A power steering pump 15 is supported by the engine 11 and has a driving pulley 16 that is driven from a crankshaft mounted pulley 17 by a belt 18. Fluid under pressure is transmitted from the power steering pump 15 to a hydraulic servo motor (not shown) through a flexible hose 19 for power assisted steering of the vehicle.

The speed of the engine 11 is varied by a throttle valve (not shown) positioned in the induction passage of the carburetor 13. A throttle lever 21 is affixed to a throttle shaft 22 that supports the throttle valve in the induction passage. The throttle lever 21 is formed with an outwardly extending projection 23 that is connected by linkage (not shown) to the accelerator pedal of the vehicle in a known manner. An adjustable screw 24 threaded through an inturned tang 25 of the throttle lever 21 contacts a fixed abutment 26 formed upon the carburetor 13 to establish a normal engine idle speed (FIGURE 3).

The loads on the steering pump 15 are greatest at the times when parking maneuvers are being executed. The engine 11 is also generally operated at its normal idle speed during the parking maneuvering. The power required to drive the power steering pump 15 during parking may exceed the power developed by the engine 11 at its normal idle speed. To prevent stalling of the engine 11 under these conditions, an idle advance mechanism, indicated generally at 27 and shown in greater detail in FIGURES 2–4, is provided.

The idle advance mechanism 27 comprises a caliper assembly having first and second elements 28 and 29 that encircle the flexible hose 19. The elements 28 and 29 have arcuate portions 31 and 32, respectively, that contact opposite sides of the flexible hose 19. The first element 28 has a tang 33 that extends through an aperture 34 formed in the second element 29 to hinge elements 28 and 29 together as one side of the flexible hose 19.

Elements 28 and 29 have extending arms 35 and 36, respectively. A protective sheath 37 of a Bowden wire actuator has one end affixed to the arm 35, as at 38. The other end of the protective sheath 37 is fixed relative to the carburetor 13 by a clamp 39 that is fastened to a bracket 41, secured to the carburetor 13. The wire 42 of the Bowden wire actuator has a ball 43 staked to its lower end. The ball 43 is held in contact with the underside of arm 36. The other end of the wire 42 has affixed thereto an adjustable swivel 44 that contacts the upper side of a lever 45 which is pivotally supported, as at 46, upon the carburetor 13.

A coil spring 47 is compressed between the clamp 39 and an adjustable stop 48 that is affixed to the wire 42. The coil spring 47 urges the wire 42 in an axially upward direction relative to protective sheath 37 and accordingly urges the ball 43 into contact with the underside of the arm 36. Because of the action of the coil spring 47, the elements 28 and 29 pivot about their hinged connection to bring the arcuate surfaces 31 and 32 into contact with the opposite sides of the flexible hose 19.

The hose 19 is formed of rubber or a similar synthetic material and is elastically expansible upon increases in internal pressure. The diameter of the hose 19, therefore, varies with the pressure within the hose. The coil spring 47 acting through the elements 28 and 29 will tend to resist the expansion at their point of contact with the hose 19. The pressure in the hose 19, when the power steering pump 15 is idling, and the rigidity of the hose 19 is sufficient to prevent collapse of the hose due to the pressure exerted upon it by the coil spring 47.

When steering maneuvers are attempted, the output pressure of the power steering pump 15 and the pressure in the flexible hose 19 increase in proportion to the load the power steering pump 15 places upon the engine 11. When the pressure in the hose 19 exceeds the resistance of the hose 19 to expansion and the action of the coil spring 47, the diameter will increase. This causes actuation of the idle advance mechanism 27 to move the components to the dotted line positions shown in FIGURES 2 and 3.

The elements 28 and 29 are moved apart about their hinge connection resulting in relative movement between the wire 42 and the protective sheath 37. Since the protective sheath 37 is axially fixed, the wire 42 will be drawn downward upon an increase in pressure. The motion of the wire 42 is transmitted through the swivel 44 to the lever 45 to cause clockwise rotation as viewed in FIGURE 2.

The clockwise motion of the lever 45 is transmitted to the throttle lever 21 to increase idle speed through contact of a cam portion 49 of the lever 45 with an inturned tang 51 of the lever 21. This action causes counterclockwise rotation of the lever 21 as viewed in FIGURE 3 and moves the adjustable screw 24 away from the fixed stop 26 to increase the idle speed of the engine 11. The maximum amount of idle advance is limited by the contact of an outwardly extending projection 52 of the lever 45 with a fixed abutment 53 formed on the body of the carburetor 13.

When the pressure in the hose 19 falls off, its diameter will again return to normal and the coil spring 47 will urge the elements 28 and 29 toward each other. The lever 45 is rotated in a counterclockwise direction by the action of the throttle return spring (not shown) acting on the throttle lever 21 and the engine resumes its normal idle speed.

The pressure at which the idle advance mechanism 27 becomes operative may be varied by changing the elasticity of the hose 19 and the tension of the spring 47 through adjustment of the stop 48. It has been found with one small displacement engine that a pressure in the hose 19 in excess of 300 p.s.i. requires idle advance. Different engines may require idle advance at different pressures.

It is to be understood that the invention is not limited to the exact construction shown and described. Although the idle advance mechanism is illustrated in conjunction with a power steering pump, it may also be employed with equal facility in an air conditioning system. The high pressure line leading from the air conditioning compressor may be used to sense the requirement for increased engine idle speed. Other changes and modifications are possible within the scope of the invention as defined by the appended claims.

I claim:

1. A motor vehicle comprising an internal combustion engine, throttle means for varying the speed of the engine and for establishing a normal idle speed, an accessory pump driven by said engine, a flexible conduit for conveying fluid under pressure from said pump to an accessory for actuating the latter, means contacting the exterior of said flexible conduit for sensing pressure induced changes in the size of said flexible conduit, and linkage means interconnecting said last named means with said throttle means for advancing the idle speed of said engine in response to increases in the fluid pressure in said flexible conduit.

2. A motor vehicle comprising an internal combustion engine, throttle means for varying the speed of the engine and for establishing a normal engine idle speed, an accessory pump driven by the engine, a conduit for conveying fluid under pressure from said accessory pump to an accessory for actuating the latter, said conduit comprising at least in part an elastically expansible hose portion, pressure responsive means including elements biased into engagement with the exterior of said hose portion, at least one of said elements being supported for movement upon pressure induced changes in the diameter of said hose portion, and linkage means operatively connecting said one of said elements to said throttle means for advancing the idle speed of said engine upon an increase in pressure in said hose portion.

3. A motor vehicle comprising an internal combustion engine, throttle means for varying the speed of the engine and for establishing a normal idle speed, an accessory pump driven by the engine, conduit means for conveying fluid under pressure from said accessory pump to an accessory for actuating the latter, said conduit comprising at least in part an elastically expansible hose portion, first and second elements yieldably biased into engagement with opposite sides of said hose portion, a Bowden wire actuator including a protective sheath and a wire, means affixing one end of said protective sheath relative to said first element and the corresponding end of said wire to said second element, means pivotally connecting said elements for causing relative movement between said protective sheath and said wire upon pressure induced changes in the diameter of said hose portion, and means operably connecting the other end of said Bowden wire actuator to said throttle means for advancing the idle speed of said engine upon relative movement between said protective sheath and said wire.

4. In combination, an internal combustion engine, a fluid pump driven by said engine, a conduit for conveying fluid from said pump to an accessory for actuating the latter, said conduit including an elastically expansible portion, said portion having a normal diameter when subjected to a low fluid output pressure and an increased diameter when the output pressure of said fluid pump increases sufficiently to actuate said accessory, means for establishing a normal idle speed for said engine, and means responsive to changes in the diameter of said elastically expansible portion for increasing the idle speed of said engine when the diameter increases from the normal diameter to the increased diameter.

5. In combination, an internal combustion engine, a fluid pump driven by said engine, a conduit for conveying fluid from said pump to an accessory for actuating the latter, said conduit including an elastically expansible portion, said portion having a normal diameter when subjected to a low fluid pump output pressure and an increased diameter when the output pressure of said pump increases sufficiently to actuate said accessory, means for establishing normal idle speed for said engine, means contacting the exterior of said elastically expansible portion for movement upon a change in the diameter of said portion from its normal diameter to its increased diameter, and linkage means coupling last named means to the means for establishing the idle speed to increase the idle speed upon an increase in the diameter of said elastically expansible portion.

References Cited by the Examiner
UNITED STATES PATENTS

| | | | |
|---|---|---|---|
| 2,517,820 | 8/50 | Aagaard | 92—90 |
| 2,634,681 | 4/53 | Rowell | 103—16 |
| 2,690,712 | 10/54 | Foote | 103—16 |
| 2,885,506 | 5/59 | Anderson | 92—90 |

FOREIGN PATENTS 545,445    7/22    France.

ROBERT M. WALKER, *Primary Examiner.*

LAURENCE V. EFNER, *Examiner.*